United States Patent
Dong

(10) Patent No.: US 12,452,836 B2
(45) Date of Patent: Oct. 21, 2025

(54) PAGING PROCESSING METHODS, BASE STATION AND USER EQUIPMENT

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 382 days.

(21) Appl. No.: 17/922,180

(22) PCT Filed: Apr. 29, 2020

(86) PCT No.: PCT/CN2020/087746
§ 371 (c)(1),
(2) Date: Oct. 28, 2022

(87) PCT Pub. No.: WO2021/217488
PCT Pub. Date: Nov. 4, 2021

(65) Prior Publication Data
US 2023/0180180 A1 Jun. 8, 2023

(51) Int. Cl.
*H04W 68/02* (2009.01)
*H04W 72/1273* (2023.01)
*H04W 72/232* (2023.01)

(52) U.S. Cl.
CPC ....... *H04W 68/02* (2013.01); *H04W 72/1273* (2013.01); *H04W 72/232* (2023.01)

(58) Field of Classification Search
CPC ............. H04W 68/02; H04W 72/1273; H04W 72/232; H04W 68/005
See application file for complete search history.

(56) References Cited

U.S. PATENT DOCUMENTS

| | | |
|---|---|---|
| 10,785,747 B2 * | 9/2020 | Kim ............... H04W 68/005 |
| 2016/0270027 A1 | 9/2016 | Ang et al. |
| 2019/0254110 A1 * | 8/2019 | He .................. H04L 41/0896 |

(Continued)

FOREIGN PATENT DOCUMENTS

| | | |
|---|---|---|
| CN | 108012329 A | 5/2018 |
| CN | 108632961 A | 10/2018 |

(Continued)

OTHER PUBLICATIONS

State Intellectual Property Office of the People's Republic of China, Office Action and Search Report Issued in Application No. 2020800008454, Dec. 5, 2024, 11 pages.

(Continued)

*Primary Examiner* — Kabir A Timory
(74) *Attorney, Agent, or Firm* — Volpe Koenig

(57) ABSTRACT

Provided are paging processing methods, a base station and a user equipment (UE). A paging processing method is applied to a base station and includes: sending paging indication information carried by at least one bit to one or more user equipments (UEs), where the paging indication information is used to indicate a number of physical downlink shared channels (PDSCHs) for carrying paging messages corresponding to one paging occasion (PO) scheduled by downlink control information (DCI). In the method, the UEs can be notified of in which PDSCH or PDSCHs paging messages need to be received by the paging indication information being sent to the UEs.

16 Claims, 5 Drawing Sheets

(56) References Cited

U.S. PATENT DOCUMENTS

| | | | |
|---|---|---|---|
| 2020/0022105 A1 | 1/2020 | Fu et al. | |
| 2020/0053670 A1* | 2/2020 | Jung | H04W 56/0015 |
| 2020/0059328 A1 | 2/2020 | Li et al. | |
| 2020/0221508 A1 | 7/2020 | Huang et al. | |
| 2021/0219263 A1 | 7/2021 | Gao et al. | |
| 2022/0159669 A1* | 5/2022 | Kim | H04W 72/121 |

FOREIGN PATENT DOCUMENTS

| | | |
|---|---|---|
| CN | 109286966 A | 1/2019 |
| CN | 109327889 A | 2/2019 |
| CN | 109474998 A | 3/2019 |
| CN | 110463283 A | 11/2019 |
| CN | 110945928 A | 3/2020 |
| CN | 110972083 A | 4/2020 |
| WO | 2018/201482 A1 | 11/2018 |
| WO | 2019/027242 A1 | 2/2019 |
| WO | 2019/158446 A1 | 8/2019 |
| WO | 2019/232732 A1 | 12/2019 |

OTHER PUBLICATIONS

Huawei, HiSilicon, "New DCI format to support efficient Paging transmission for MTC UEs", R1-156448, 3GPP TSG RAN WG1 Meeting #83, Anaheim, USA, Nov. 15-22, 2015, 4 pages.

ISA State Intellectual Property Office of the People's Republic of China, Written Opinion of the International Searching Authority Issued in Application No. PCT/CN2020/087746, Jan. 26, 2021, WIPO, 8 pages.

ISA State Intellectual Property Office of the People's Republic of China, International Search Report Issued in Application No. PCT/CN2020/087746, Jan. 26, 2021, WIPO, 5 pages.

Huawei et al. "UE power saving for paging", 3GPP TSG RAN WG1 Meeting #95, R1-1812685, Spokane, USA, Nov. 16, 2018 (Nov. 16, 2018), 4 pages.

CMCC, "Discussion on paging capacity", R2-1808323, 3GPP TSG-RAN WG2 Meeting #102, Busan, Korea, May 21-25, 2018, 4 pages.

* cited by examiner

PAGING PROCESSING METHODS, BASE STATION AND USER EQUIPMENT

CROSS REFERENCE TO RELATED APPLICATIONS

This application is the national phase of International Application No. PCT/CN2020/087746 filed on Apr. 29, 2020, the disclosure of which is hereby incorporated by reference in its entirety for all purposes.

TECHNICAL FIELD

The present disclosure relates to, but is not limited to, the field of wireless communication technologies, in particular to paging processing methods and apparatuses, a communication device and a storage medium.

BACKGROUND

In the related art, when a user equipment (UE) is in a radio resource control idle (RRC-IDLE) state or a radio resource control inactive (RRC-INACTIVE) state, a main behavior of the UE is to periodically listen to a paging message. After receiving a paging message, the UE will enter a radio resource control (RRC-CONNECTED) state for normal communication. The paging message is carried in a physical downlink shared channel (PDSCH), and need to be scheduled by downlink control information (DCI) scrambled by a paging radio network temporary identity (P-RNTI). A PDSCH for carrying paging messages can carry paging messages for up to 32 UEs. A paging occasion (PO) for a UE appears periodically. A plurality of UEs may use PO resources in a same period, that is, paging messages for a plurality of UEs may appear in one PO.

In the process of paging, the UE needs to monitor the PDSCH for carrying paging messages that are scheduled by paging DCI (that is, the DCI scrambled by P-RNTI) in each PO. If the paging period of the UE is short, UE energy consumption and wireless time-frequency resources will be wasted. However, if the paging period of the UE is long, the paging capacity of the PDSCH will be insufficient.

SUMMARY

According to a first aspect of the embodiments of the present disclosure, there is provided a paging processing method which is applied to a base station, including:
  sending paging indication information carried by at least one bit to one or more user equipments (UEs), wherein the paging indication information is used to indicate a number of physical downlink shared channels (PDSCHs) for carrying paging messages corresponding to one paging occasion (PO) scheduled by downlink control information (DCI).

According to a second aspect of the embodiments of the present disclosure, there is provided a paging processing method which is applied to a user equipment (UE), including:
  receiving paging indication information carried by at least one bit sent by a base station, where the paging indication information is used to indicate a number of physical downlink shared channels (PDSCHs) for carrying paging messages corresponding to one paging occasion (PO) scheduled by downlink control information (DCI);
  monitoring the paging messages corresponding to the one PO based on the paging indication information.

According to a third aspect of the embodiments of the present disclosure, there is provided a base station, including:
  a processor; and
  a memory configured to store instructions executable by the processor;
  where the processor is configured to execute the instructions to implement the paging processing method according to any embodiment in the first aspect of the present disclosure.

According to a fourth aspect of the embodiments of the present disclosure, there is provided a user equipment (UE), including:
  a processor; and
  a memory configured to store instructions executable by the processor;
  where the processor is configured to execute the instructions to implement the paging processing method according to any embodiment in the second aspect of the present disclosure.

DETAILED DESCRIPTION OF THE EMBODIMENTS

Exemplary embodiments will be described in detail herein, examples of which are illustrated in the accompanying drawings. When the following description refers to the drawings, unless otherwise indicated, the same numerals in different drawings indicate the same or similar elements. The embodiments described below do not represent all embodiments consistent with embodiments of the present disclosure. Rather, they are merely examples of apparatus and method consistent with some aspects of the embodiments of the present disclosure, as recited in the appended claims.

Terms used in the embodiments of the present disclosure are for the purpose of describing specific embodiments only, and are not intended to limit the embodiments of the present disclosure. The singular forms "a", "an" and "this" used in the embodiments of the present disclosure and the appended claims are also intended to include plural forms, unless the context clearly indicates other meanings. It should also be understood that the term "and/or" as used herein refers to and includes any and all possible combinations of one or more of the associated listed items.

It should be understood that although terms first, second, third, etc. may be used in the embodiments of the present disclosure to describe various information, such information should not be limited to these terms. These terms are only used to distinguish the same type of information from each other. For example, first information may also be referred to as second information, and similarly, the second information may also be referred to as the first information without departing from the scope of the embodiments of the present disclosure. Depending on the context, the word "if" as used herein can be interpreted as "at the time of", "when" or "in response to determining".

Figure 1:
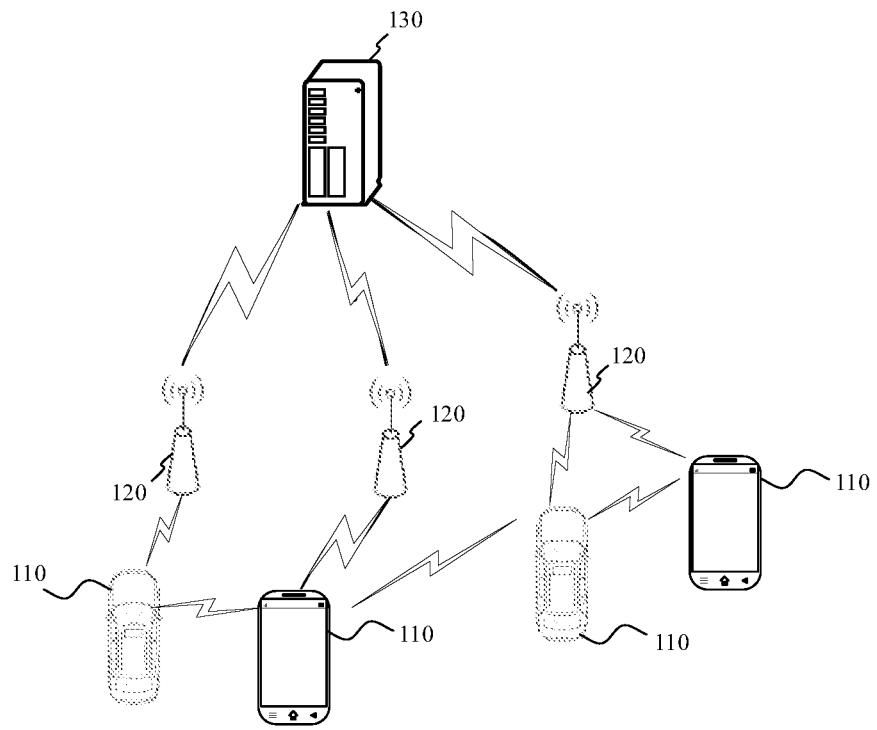
FIG. 1 is a schematic structural diagram illustrating a wireless communication system.

Please refer to FIG. 1, which shows a schematic structural diagram of a wireless communication system according to an embodiment of the present disclosure. As shown in FIG. 1, the wireless communication system is a communication system based on the cellular mobile communication technology. The wireless communication system may include a plurality of user equipments 110 and a plurality of base stations 120.

The user equipment 110 may be a device that provides voice and/or data connectivity services to a user. The user equipment 110 may communicate with one or more core networks via a Radio Access Network (RAN). The user equipment 110 may be an Internet of Things user equipment, such as a sensor device, a mobile phone (or "cellular" phone) and a computer with an Internet of Things user equipment. For example, the user equipment 110 may be a fixed device, a portable device, a pocket-sized device, a handheld device, a device built in a computer or a vehicle-mounted device. For example, the user equipment 110 may be a station (STA), a subscriber unit, a subscriber station, a mobile station, a mobile, a remote station, an access point, a remote terminal, an access terminal, a user terminal, a user agent, a user device, or a user equipment. In an example, the user equipment 110 may also be a device of an unmanned aerial vehicle. In an example, the user equipment 110 may also be a vehicle-mounted device, for example, may be a trip computer having a wireless communication function, or a wireless user equipment connected to the trip computer. In an example, the user equipment 110 may also be a roadside device, for example, may be a street lamp, a signal lamp, or other roadside devices with a wireless communication function.

The base station 120 may be a network side device in a wireless communication system. The wireless communication system may be a 4th Generation mobile communication (4G) system, also known as a Long Term Evolution (LTE) system. In an example, the wireless communication system may also be a 5G system, also known as a New Radio (NR) system or a 5G NR system. In an example, the wireless communication system may also be a next generation of the 5G system. An access network in the 5G system may be called New Generation-Radio Access Network (NG-RAN).

The base station 120 may be an Evolved Node B (eNB) used in the 4G system. In an example, the base station 120 may also be a next Generation Node B (gNB) adopting a central distributed architecture in the 5G system. The base station 120, when adopting a central distributed architecture, usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer may be arranged in the CU. A protocol stack of a Physical (PHY) layer may be arranged in the DU. A specific implementation manner of the base station 120 is not limited in the embodiment of the present disclosure.

A wireless connection may be established between the base station 120 and the user equipment 110 through a radio interface. In different implementations, the radio interface may be a radio interface based on the 4th Generation mobile communication network technology (4G) standard; or, the radio interface may be a radio interface based on the 5th Generation mobile communication network technology (5G) standard, for example, the radio interface may be a NR interface. In an example, the radio interface may also be a radio interface based on a next-generation mobile communication network technology standard of 5G.

In some embodiments, an End to End (E2E) connection may also be established between the user equipments 110, for example, in scenarios such as vehicle to vehicle (V2V) communication, vehicle to infrastructure (V2I) communication and vehicle to pedestrian (V2P) communication in vehicle to everything (V2X) communication.

Herein, the above mentioned user equipment can be considered as the terminal device in the following embodiments.

In some embodiments, the above wireless communication system may further include a network management device 130.

The plurality of base stations 120 may be connected with the network management device 130. The network management device 130 may be a core network device in the wireless communication system. For example, the network management device 130 may be a Mobility Management Entity (MME) in an Evolved Packet Core (EPC). Or, the network management device 130 may also be another core network device, for example, a Serving GateWay (SGW), a Public Data Network GateWay (PGW), a Policy and Charging Rules Function (PCRF) unit or a Home Subscriber Server (HSS). An implementation form of the network management device 130 is not limited in the embodiment of the present disclosure.

The embodiments of the present disclosure provide paging processing methods and apparatuses, a user equipment, a base station and a storage medium.

Figure 2:
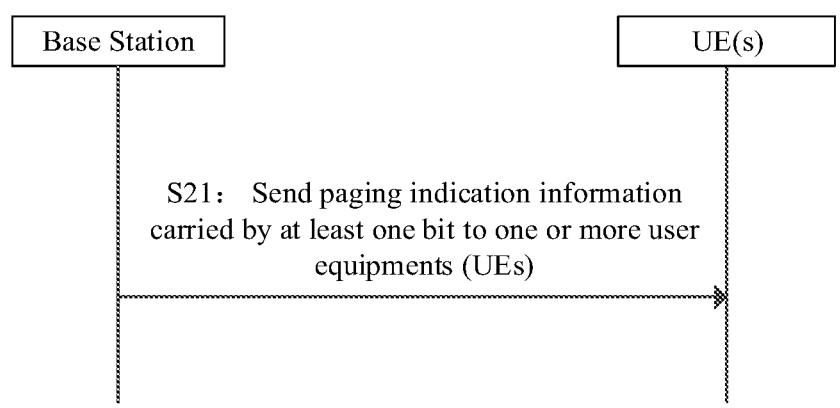
FIG. 2 is a flowchart illustrating a paging processing method according to an exemplary embodiment.

As shown in FIG. 2, there is provided a paging processing method in an embodiment. The method is applied to a base station and includes:

Step S21: paging indication information carried by at least one bit is sent to one or more user equipments (UEs).

The paging indication information is used to indicate a number of physical downlink shared channels (PDSCHs) for carrying paging messages corresponding to one paging occasion (PO) scheduled by downlink control information (DCI).

The base station described in the embodiment of the present disclosure is an interface device (or access device) for the user equipments to access the Internet. The base station can be in various types, for example, the base station can be a 3G base station, a 4G base station, a 5G base station or other evolved base stations.

The user equipments (UEs) described in the embodiment of the present disclosure can be mobile phones, computers, servers, transceivers, tablet devices or medical devices, etc.

In an embodiment, resource locations of one or more PDSCHs scheduled to carry paging messages are indicated by the DCI. If a piece of DCI schedules a plurality of PDSCHs for carrying paging messages, the DCI will indicate the resource location of the first PDSCH. The resource locations of other PDSCHs can be derived from the resource location of the first PDSCH and a predetermined resource allocation rule. Both the base station and UEs can know the resource allocation rule in advance.

In an embodiment, the paging indication information is used to indicate that the number of PDSCHs scheduled by a piece of DCI is one.

In another embodiment, the paging indication information is used to indicate that the number of PDSCHs scheduled by a piece of DCI is multiple. Here, the multiple PDSCHs include two or more PDSCHs.

Herein, a PDSCH carries paging messages for a predetermined number of UEs. The predetermined number can be different according to different communication protocols. For example, in a 5G NR protocol, the predetermined number herein is 32. As another example, in a 4G LTE protocol, the predetermined number herein is 16.

In an embodiment, a PDSCH can include a paging record table. The paging record table carries the identification information of UEs to be paged and paging messages for the UEs to be paged.

In the embodiment of the present disclosure, if the paging indication information indicates that a piece of DCI schedules a PDSCH, it can adapt to the application scenario with a small number of UEs to be paged. In this way, in the application scenario with a small number of UEs to be paged, UEs can also be configured with a relatively long paging period, so that these UEs stay in a deep sleep state for most of the time, thus improving the energy saving effect of the UEs.

In another example, if the paging indication information indicates that a piece of DCI schedules a plurality of PDSCHs, it can adapt to the scenario with a large number of UEs to be paged. On the premise of ensuring sufficient paging capacity, the UEs can be configured with a long paging period, so that the UEs stay in a deep sleep state for most of the time, thus greatly improving the energy saving effect of the UEs.

Here, the at least one bit includes one bit or a plurality of bits. Here, the plurality of bits are two or more bits.

For example, if the number of PDSCHs scheduled by a piece of DCI is one, it can be indicated by one bit "0"; if the number of PDSCHs scheduled by a piece of DCI is 2, it can be indicated by one bit "1".

As another example, if the number of PDSCHs scheduled by a piece of DCI is 2, it can be indicated by 2 bits "10"; if the number of PDSCHs scheduled by a piece of DCI is 3, it can be indicated by 2 bits "11", etc.

In this way, in the embodiment of the present disclosure, the number of PDSCHs scheduled by the DCI can be indicated by one bit or a small number of bits, so that a small amount of bit data can be transmitted and the waste of resources can be reduced as much as possible.

In the embodiment of the present disclosure, the paging indication information can be carried by at least one bit and sent to the UEs, so that the UEs know the number of PDSCHs that can be scheduled by the DCI in advance. Therefore, the UEs can know in which PDSCH the paging messages need to be received based on the number of PDSCHs and the first PDSCH actually monitored.

In addition, since the UEs can be informed in which PDSCH to receive paging messages only by paging indication information sent from the base station, the implementation is relatively simple.

In some embodiments, the step S21 includes:
the DCI including the paging indication information is sent to the UEs, where the paging indication information is carried by at least one bit of the DCI.

Herein, the DCI is DCI used for paging scheduling. For example, in an embodiment, the DCI is DCI scrambled by a paging radio network temporary identity (P-RNTI).

In an embodiment, the DCI is DCI 1-0, and the paging indication information is carried in a reserved bit field of the DCI 1-0.

Herein, the reserved bits in DCI 1-0 for paging include the following two cases: 1) 6 bits in the last information field in DCI 1-0 are reserved; 2) in the current protocol version, the last 3-8 bits of 8 bits in a Short Messages information field in DCI 1-0 are reserved regardless of whether there is a short message or not. For example, the $3^{rd}$ bit in the last information field in DCI 1-0 carries the paging indication information. As another example, $4^{th}$ and $5^{th}$ bits in the Short Messages information field in DCI 1-0 carry the paging indication information.

In the embodiment of the present disclosure, the paging indication information can be carried based on a reserved bit field in DCI. On the one hand, the compatibility of the DCI can be improved, so that the DCI can specifically indicate in how many PDSCHs paging messages are scheduled while indicating the scheduling of paging messages in one or more PDSCHs.

On the other hand, the number of scheduled PDSCHs can be indicated by the DCI for scheduling paging, there is no need to use additional signaling or information to carry the paging indication information indicating the PDSCHs, thus further reducing information interaction and the waste of resources.

In some embodiments, the method further includes:
a system message including a maximum number of the PDSCHs allowed to be scheduled by the DCI is broadcast.

The number of the PDSCHs scheduled by the DCI, which is indicated by the paging indication information, is less than or equal to the maximum number.

For example, in an application scenario, the base station can first broadcast a system message, which indicates that a maximum number of the PDSCHs allowed to be scheduled by the DCI is 8; and the base station sends a piece of DCI to the UEs, where the paging indication information carried in the DCI indicates that the number of scheduled PDSCHs is 5.

In the embodiment of the disclosure, a system message including a maximum number of the PDSCHs allowed to be scheduled by the DCI can be broadcast first, and paging indication information indicating the number of PDSCHs actually scheduled by corresponding DCI can be sent for different paging occasions.

In addition, the maximum number carried by the system message can also notify the UEs of the number of bits of the subsequent DCI that need to be monitored. For example, when the maximum number is 8, the UEs can be notified that the number of bits of the subsequent DCI that need to be monitored is 3. As another example, when the maximum number is 4, the UE can be notified that the number of bits of the subsequent DCI that need to be monitored is 2.

In some embodiments, the step S21 includes:
a system message including the paging indication information is broadcast, where the paging indication information is carried by at least one bit in the system message.

In the embodiment of the present disclosure, a system message can be broadcast in advance to notify the UEs of the paging indication information. In this way, a plurality of UEs to be paged can be notified by the system message being broadcasted only once, thus greatly saving the signaling overhead.

Herein, after step S21 (a system message including the paging indication information carried by the at least one bit is broadcast), a piece of DCI for paging scheduling can be further sent. For example, in some embodiments, the method further includes: DCI for paging scheduling is sent to the UEs after the system message is broadcast. In this way, in this embodiment, when receiving the DCI for paging scheduling, the UEs can know the number of PDSCHs scheduled by the DCI for paging scheduling through the paging indication information carried in the broadcast system message.

In an embodiment of the present disclosure, the paging indication information can also be specified in a protocol, in addition to being carried by the DCI and sent to the UEs, or being carried by the system message and sent to the UEs by broadcasting.

For example, in some embodiments, the paging indication information may be specified in a protocol. In this way, in this embodiment, the base station or UEs can know the number of the PDSCHs scheduled by a piece of DCI through querying for the protocol. Thus, the UEs can know the number of PDSCHs scheduled by the DCI without any signaling or information on the paging indication information being transmitted, thereby further reducing signaling interaction and signaling overhead, and saving system resources.

Figure 3:
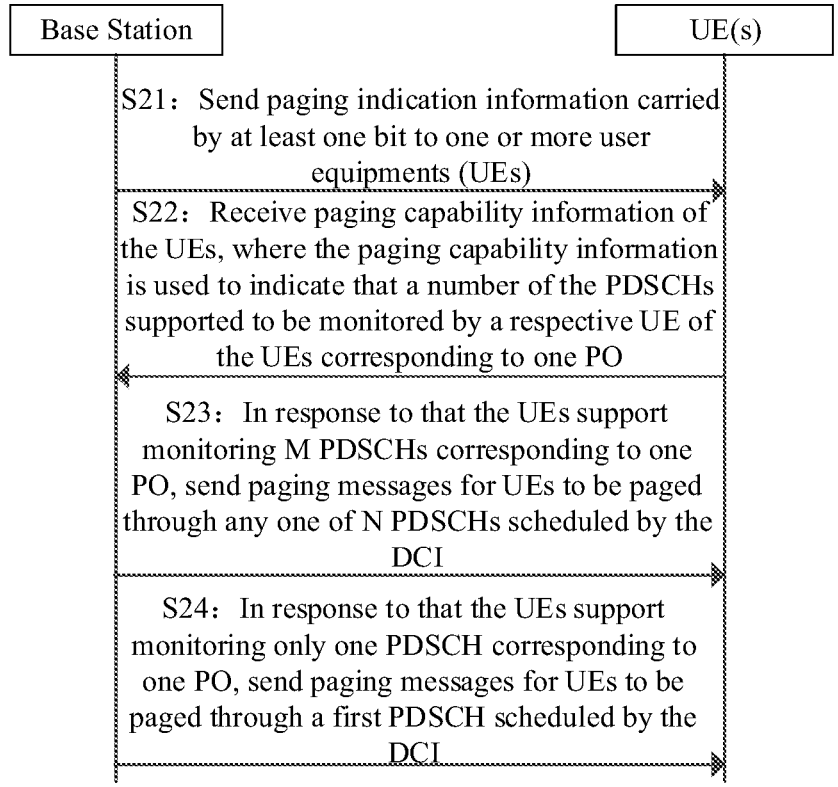
FIG. 3 is a flowchart illustrating a paging processing method according to an exemplary embodiment.

As shown in FIG. 3, the method further includes:

Step S22: paging capability information of the UEs is received, where the paging capability information is used to indicate a number of the PDSCHs supported to be monitored by a respective UE of the UEs corresponding to one PO.

Herein, the UEs include a first type of UEs or a second type of UEs.

In an embodiment, the paging capability of the first type of UEs is to support monitoring only one PDSCH corresponding to one PO, and the paging capability of the second type of UEs is to support monitoring a plurality of PDSCHs corresponding to one PO.

In an embodiment of the present disclosure, if the UEs are the first type of UEs, the UEs only monitor the first PDSCH scheduled in the paging regardless of the number of scheduled PDSCHs, so as to obtain paging messages of UEs to be paged based on the first PDSCH. In addition, when receiving the DCI or the system message, the UEs will directly ignore the paging indication information carried in the DCI or the system message, and will not perform corresponding operations because of the paging indication information carried by at least one bit.

Or, if the UEs are the second type of UEs, when the number of PDSCHs indicated by the paging indication information is one, the UEs will monitor one PDSCH; when the number of PDSCHs indicated by the paging indication information is M, the UEs will monitor M PDSCHs, where M is a natural number greater than or equal to 2. Therefore, if the UEs are the second type of UEs, the UEs can monitor a number of PDSCHs, the number being indicated in the paging indication information, in order to obtain paging messages.

In some embodiments, paging capability information of the UEs is received, includes:

the paging capability information of the UEs sent by the UEs or a core network is received.

Herein, when the UEs are in a radio resource control connected (RRC-CONNECTED) state, the UEs will send the paging capability information of the UEs to the base station or the core network.

Thus, in the embodiment of the present disclosure, if the UEs are in the RRC-CONNECTED state, the base station can directly obtain the paging capability information of the UEs from the UEs, thus improving the accuracy of obtaining the paging capability information.

In another example, if the UEs are in a radio resource control inactive (RRC-INACTIVE) state or a radio resource control idle (RRC-IDLE) state, the base station can also obtain pre-stored paging capability information of the UEs from the core network.

In other embodiments, if the UEs are in the RRC-CONNECTED state, the base station can also obtain the paging capability information of the UEs from the core network.

In an embodiment, the step S21 further includes:

based on the paging capability information, the paging indication information carried by the at least one bit is sent to the UEs.

In an embodiment, the location where paging information of the UEs is carried can also be determined based on the paging capacity information of UEs to be paged. For example, for a UE of which the paging capability is to support monitoring only one PDSCH corresponding to one PO, the paging information of the UE will be carried in the first PDSCH scheduled by the DCI for paging scheduling. As another example, for a UE of which the paging capability is to support monitoring M PDSCHs corresponding to one PO, the paging information of the UE can be carried in any PDSCH of the M PDSCHs scheduled by the DCI for paging scheduling. In this way, the paging information of UEs with different paging capabilities can be carried in appropriate PDSCHs, so as to ensure that the UEs with different paging capabilities can detect their own paging information.

Referring to FIG. 3 again, in some embodiments, the method further includes:

Step S23: in response to that the UEs support monitoring M PDSCHs corresponding to one PO, paging messages for UEs to be paged are sent through any one of N PDSCHs scheduled by the DCI;

where the M and the N are positive integers greater than or equal to 2, and the N is less than or equal to M.

Herein, if the UEs support monitoring M PDSCHs corresponding to one PO, paging indication information indicating that a piece of DCI schedules N PDSCHs can be configured for the UEs, where the N is less than the M. In this way, the number of PDSCHs monitored by the UEs can always be within the paging capacity, thus reducing the occurrence that the corresponding paging message cannot be detected due to exceeding the paging capacity of the UEs.

Herein, if the paging indication information indicates that the number of PDSCHs scheduled by a piece of DCI is N, paging messages of UEs to be paged can be configured in any one of the N PDSCHs. In this way, in the embodiment of the present disclosure, a variety of ways of carrying paging messages of the UEs to be paged can be provided.

Referring to FIG. 3 again, in other embodiments, the method further includes:

Step S24: in response to that the UEs support monitoring only one PDSCH corresponding to one PO, paging messages for UEs to be paged are sent through a first PDSCH scheduled by the DCI.

Herein, if the UEs support monitoring only one PDSCH corresponding to one PO, paging indication information indicating that a piece of DCI schedules one PDSCH can be configured for the UEs; and paging messages of UEs to be paged are carried in the one PDSCH.

Thus, in the embodiment of the present disclosure, the UEs can obtain the paging messages of the UEs to be paged from the first PDSCH to determine whether the UEs themselves are paged.

In some embodiments, the method further includes:

the UEs are grouped to form one or more UE groups, and a corresponding relationship between the one or more UE groups and one or more PDSCHs scheduled by the DCI is determined. For example, one UE group may correspond to one or more PDSCHs.

Figure 4:
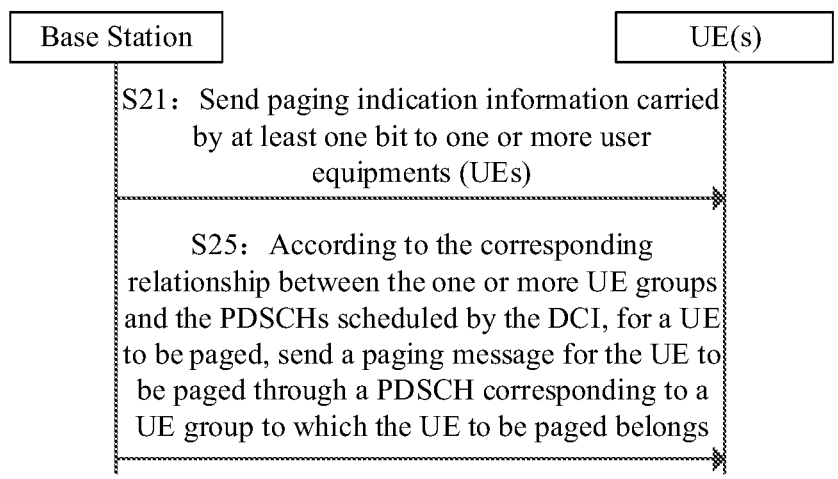
FIG. 4 is a flowchart illustrating a paging processing method according to an exemplary embodiment.

As shown in FIG. 4, in some embodiments, the method further includes:

Step S25: according to the corresponding relationship between the one or more UE groups and the PDSCHs scheduled by the DCI, for a UE to be paged, a paging message for the UE to be paged is sent through a PDSCH corresponding to a UE group to which the UE to be paged belongs.

In an embodiment, the number of the UE groups is less than or equal to the number of the PDSCHs. Here, the number of the PDSCHs is the number of the PDSCHs scheduled by a piece of DCI.

For example, in an application scenario, the paging indication information indicates that the number of PDSCHs scheduled by a piece of DCI is 2. The paging information of a UE whose UE ID belongs to group 1 is in the first PDSCH, and the paging information of a UE whose UE ID belongs to group 2 is in the second PDSCH. There are various ways of grouping. For example, if the total number of UE IDs is expressed by 48 bits, UEs whose UE IDs range from 0 to ($2^{47}$-1) are in the first group, and UEs whose UE IDs range from $2^{47}$ to ($2^{48}$-1) is in the second group.

In the embodiment of the disclosure, the paging message for the UE to be paged can be sent through a PDSCH corresponding to the UE group to which the UE to be paged belongs, so that the UE can only monitor one or more corresponding PDSCHs when monitoring PDSCHs, thus the resource consumption of the UEs can be greatly reduced.

In some embodiments, the method further includes:

the corresponding relationship between the one or more UE groups and the PDSCHs scheduled by the DCI is sent to the UEs by broadcasting.

In this way, in the embodiment of the disclosure, the UEs can know in advance UE groups to which the UEs themselves belong and PDSCHs corresponding to the UE groups to which the UEs themselves belong, so that the UEs can know in which PDSCH or PDSCHs paging resources should be received.

In other embodiments, the UE groups can be specified in a protocol, or the corresponding relationship between the UE groups and the PDSCHs can be specified in the protocol.

In this way, in the embodiment of the disclosure, the UEs can know in advance UE groups to which the UEs themselves belong or PDSCHs corresponding to the UE groups to which the UEs themselves belong. On the premise that the UEs can know in which PDSCH or PDSCHs paging resources should be received, signaling overhead can be further reduced. The UEs do not need to be notified of UE groups to which the UEs themselves belong or the PDSCHs corresponding to the UE groups through signaling.

It should be pointed out here that the following paging processing methods are applied to a user equipment and are similar to the description of the above paging processing methods applied to a base station. For the technical details not disclosed in the embodiments of the paging processing methods applied to the user equipment in the present disclosure, please refer to the description of the embodiments of the paging processing methods applied to the base station in the present disclosure, which will not be described in detail herein.

Figure 5:
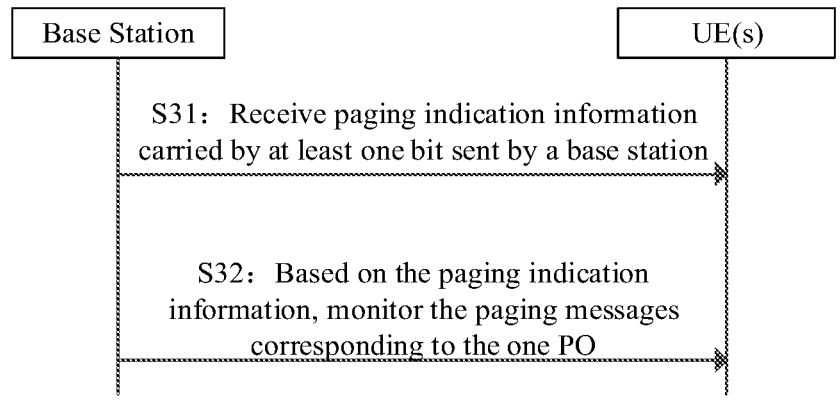
FIG. 5 is a flowchart illustrating a paging processing method according to an exemplary embodiment.

As shown in FIG. 5, there is also provided a paging processing method applied to a user equipment (UE) in the embodiments of the present disclosure. The method includes:

Step S31: paging indication information carried by at least one bit sent by a base station is received;

where the paging indication information is used to indicate a number of physical downlink shared channels (PDSCHs) for carrying paging messages corresponding to one paging occasion (PO) scheduled by downlink control information (DCI);

Step S32: based on the paging indication information, the paging messages corresponding to the one PO is monitored.

In some embodiments, the step S31 includes:

the DCI including the paging indication information sent by the base station is received, where the paging indication information is carried by at least one bit of the DCI.

In some embodiments, the DCI is DCI 1-0, and the paging indication information is carried in a reserved bit field of the DCI 1-0.

In some embodiments, the method further includes:

a system message including a maximum number of the PDSCHs allowed to be scheduled by the DCI broadcast by the base station is received;

where the number of the PDSCHs scheduled by the DCI, which is indicated by the paging indication information, is less than or equal to the maximum number.

In some embodiments, the step S31 includes:

a system message including the paging indication information broadcast by the base station is received, where the paging indication information is carried by at least one bit of the system message.

In some embodiments, the method further includes:

paging capability information of the UE is sent, where the paging capability information is used to indicate a number of the PDSCHs supported to be monitored by the UE corresponding to one PO.

In some embodiments, the step S32 includes:

the paging messages are monitored on N PDSCHs scheduled by the DCI; where the N is less than or equal to M which is a number of the PDSCHs supported to be monitored by the UE corresponding to one PO, and the M and the N are positive integers greater than or equal to 2;

or, the paging messages are monitored on a first PDSCH of N PDSCHs scheduled by the DCI, where the N is a positive integer greater than or equal to 2.

Here, the N being less than or equal to M which is a number of the PDSCHs supported to be monitored by the UE corresponding to one PO refers to: the N is less than or equal to M, where the M is the number of the PDSCHs supported to be monitored by the UE corresponding to one PO.

In some embodiments, sending the paging capability information of the UE includes:

sending the paging capability information of the UE to the base station or a core network.

In some embodiments, the step S32 further includes:
according to a corresponding relationship between one or more UE groups and the PDSCHs, the paging messages are monitored on one or more PDSCHs corresponding to a UE group to which the UE belongs.

Figure 6:
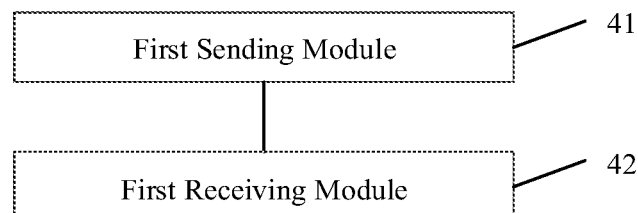
FIG. 6 is a block diagram illustrating a paging processing apparatus according to an exemplary embodiment.

As shown in FIG. 6, an embodiment of the present disclosure provides a paging processing apparatus, which is applied to a base station. The apparatus includes:

a first sending module 41, configured to send paging indication information carried by at least one bit to one or more user equipments (UEs), where the paging indication information is used to indicate a number of physical downlink shared channels (PDSCHs) for carrying paging messages corresponding to one paging occasion (PO) scheduled by downlink control information (DCI).

In some embodiments, the first sending module 41 is configured to send the DCI including the paging indication information to the UEs, where the paging indication information is carried by at least one bit of the DCI.

In some embodiments, the DCI is DCI 1-0, and the paging indication information is carried in a reserved bit field of the DCI 1-0.

In some embodiments, the first sending module 41 is configured to broadcast a system message including a maximum number of the PDSCHs allowed to be scheduled by the DCI;

where the number of the PDSCHs scheduled by the DCI, which is indicated by the paging indication information, is less than or equal to the maximum number.

In some embodiments, the first sending module 41 is configured to broadcast a system message including the paging indication information, wherein the paging indication information is carried by at least one bit of the system message.

In some embodiments, the apparatus further includes:
a first receiving module 42, configured to receive paging capability information of the UEs, wherein the paging capability information is used to indicate a number of the PDSCHs supported to be monitored by a respective UE of the UEs corresponding to one PO.

In some embodiments, the first sending module 41 is configured to, for a UE to be paged, in response to that the UE to be paged supports monitoring M PDSCHs corresponding to one PO, send a paging message for the UE to be paged through any one of N PDSCHs scheduled by the DCI; wherein the M and the N are positive integers greater than or equal to 2, and the N is less than or equal to M;
and/or,
in response to that the UE to be paged supports monitoring only one PDSCH corresponding to one PO, send a paging message for the UE to be paged through a first PDSCH scheduled by the DCI.

In some embodiments, the first receiving module 42 is configured to receive the paging capability information of the UEs sent by the UEs or a core network.

In some embodiments,
the first sending module 41 is further configured to, for a UE to be paged, according to a corresponding relationship between one or more UE groups and the PDSCHs scheduled by the DCI, sending a paging message for the UE to be paged through a PDSCH corresponding to the UE group to which the UE to be paged belongs.

Figure 7:
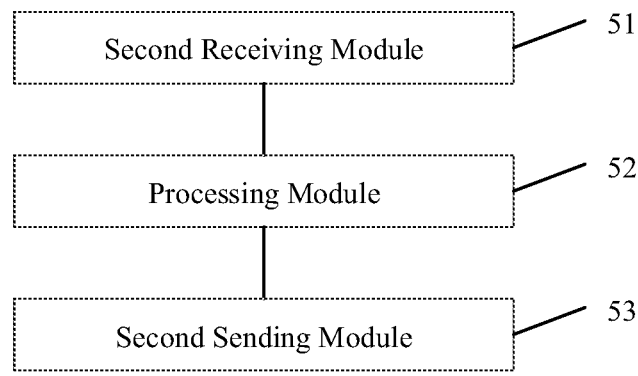
FIG. 7 is a block diagram illustrating a paging processing apparatus according to an exemplary embodiment.

As shown in FIG. 7, an embodiment of the present disclosure provides a paging processing apparatus, which is applied to a user equipment (UE). The apparatus includes:

a second receiving module 51, configured to receive paging indication information carried by at least one bit sent by a base station, where the paging indication information is used to indicate a number of physical downlink shared channels (PDSCHs) for carrying paging messages corresponding to one paging occasion (PO) scheduled by downlink control information (DCI); and a processing module 52, configured to monitor the paging messages corresponding to the one PO based on the paging indication information.

In some embodiments, the second receiving module 51 is configured to receive the DCI including the paging indication information sent by the base station, where the paging indication information is carried by at least one bit of the DCI.

In some embodiments, the DCI is DCI 1-0, and the paging indication information is carried in a reserved bit field of the DCI 1-0.

In some embodiments, the second receiving module 51 is configured to receive a system message including a maximum number of the PDSCHs allowed to be scheduled by the DCI broadcast by the base station;

where the number of the PDSCHs scheduled by the DCI, which is indicated by the paging indication information, is less than or equal to the maximum number.

In some embodiments, the second receiving module 51 is configured to receive a system message including the paging indication information broadcast by the base station, wherein the paging indication information is carried by at least one bit of the system message.

In some embodiments, the apparatus further includes:
a second sending module 53, configured to send paging capability information of the UE, where the paging capability information is used to indicate that a number of the PDSCHs supported to be monitored by the UE corresponding to one PO.

In some embodiments, the processing module 52 is configured to monitor the paging messages on N PDSCHs scheduled by the DCI; where the N is less than or equal to M which is a number of the PDSCHs supported to be monitored by the UE corresponding to one PO, and the M and the N are positive integers greater than or equal to 2;
or,
the processing module 52 is configured to monitor the paging messages on a first PDSCH of N PDSCHs scheduled by the DCI, where the N is a positive integer greater than or equal to 2.

In some embodiments, the second sending module 53 is configured to send the paging capability information of the UE to the base station or a core network.

In some embodiments, the processing module 52 is configured to, according to a corresponding relationship between one or more UE groups and the PDSCHs scheduled by the DCI, monitor the paging messages on one or more PDSCHs corresponding to a UE group to which the UE belongs.

As for the apparatuses in the above embodiments, the specific mode of each module to perform operations has been described in detail in the embodiments of the methods, and will not be described in detail herein.

An embodiment of the present disclosure provides a communication device, which includes:
a processor; and
a memory configured to store instructions executable by the processor;

where the processor is configured to execute the instructions to implement the paging processing method applied to the communication device described in any embodiment of the present disclosure.

Herein, the communication device includes a base station or a user equipment.

The processor can include various types of storage media, which are non-temporary computer storage media, and can continue to memorize information stored on the communication device after the power is turned off.

The processor can be connected to the memory through a bus or the like, and used to read executable programs stored on the memory, for example, at least one of the methods shown in FIGS. 2 to 5.

The embodiments of the present disclosure also provide a computer storage medium, where the computer storage medium stores a computer executable program that, when executed by a processor, implements the paging processing method described in any embodiment of the present disclosure, for example, at least one of the methods shown in FIGS. 2 to 5.

With regard to the apparatuses in the above embodiments, the specific manner in which each module performs operations has been described in detail in the embodiments of the methods, and will not be described in detail herein.

Figure 8:
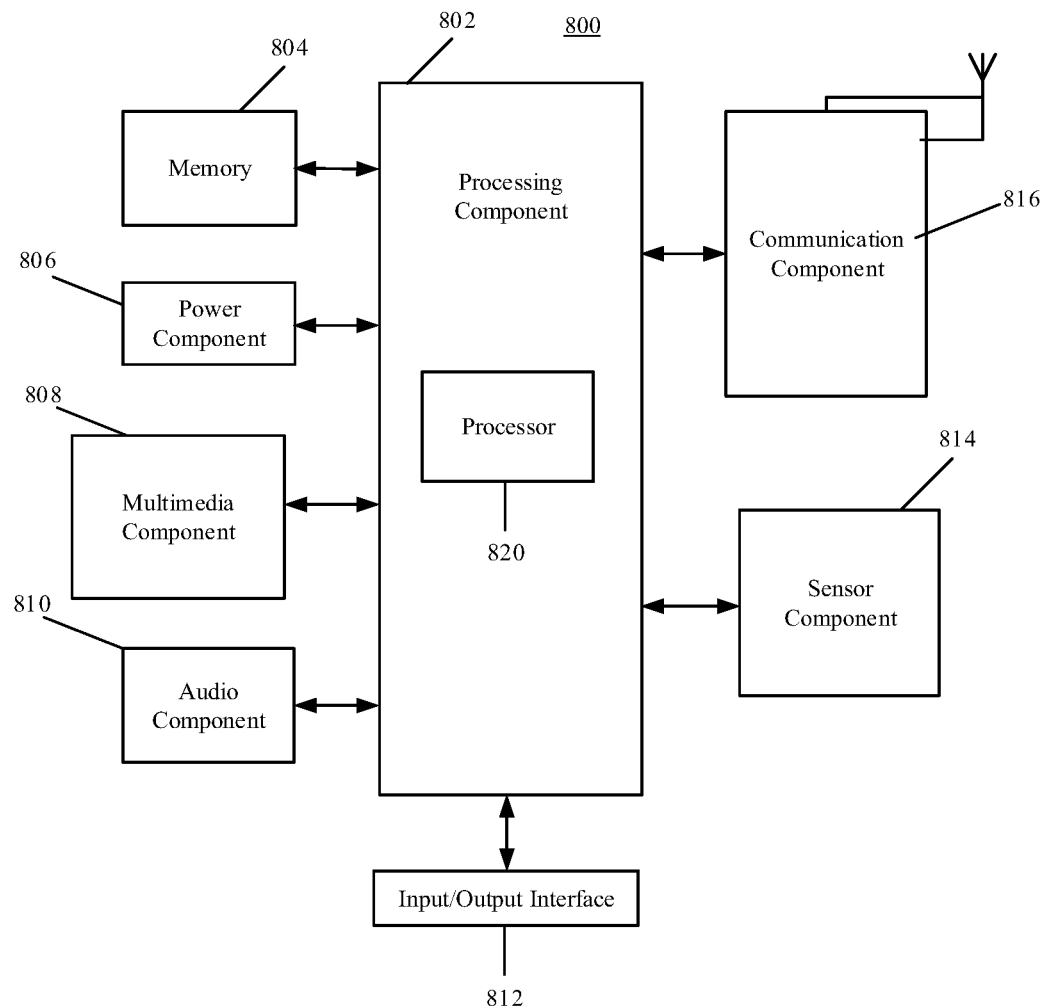
FIG. 8 is a block diagram illustrating a user equipment according to an exemplary embodiment.

FIG. 8 is a block diagram of a user equipment (UE) 800 according to an exemplary embodiment. For example, the user equipment 800 may be a mobile phone, a computer, a digital broadcasting device, a messaging device, a game console, a tablet device, a medical device, a fitness device, a personal digital assistant, or the like.

Referring to FIG. 8, the user equipment 800 can include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the user equipment 800, such as operations associated with display, telephone calls, data communications, camera operations, and recording operations. The processing component 802 can include one or more processors 820 to execute instructions to complete all or part of the steps of the above methods. In addition, the processing component 802 can include one or more modules to facilitate interaction between the processing component 802 and other components. For example, the processing component 802 can include a multimedia module to facilitate interaction between the multimedia component 808 and the processing component 802.

The memory 804 is configured to store various types of data to support operations at the user equipment 800. Examples of such data include instructions for any application or method operating on the user equipment 800, contact data, phone book data, messages, pictures, videos, and so on. The memory 804 can be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 806 provides power to various components of the user equipment 800. The power component 806 can include a power management system, one or more power sources, and other components associated with generating, managing, and distributing power for the user equipment 800.

The multimedia component 808 includes a screen that provides an output interface between the user equipment 800 and a user. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor can not only sense boundaries of a touch or swipe action, but also detect the duration and pressure related to the touch or swipe action. In some embodiments, the multimedia component 808 includes a front camera and/or a rear camera. When the user equipment 800 is in an operation mode, such as a shooting mode or a video mode, the front camera and/or the rear camera can receive external multimedia data. Each of the front and rear cameras can be a fixed optical lens system or have focal length and optical zooming capabilities.

The audio component 810 is configured to output and/or input audio signals. For example, the audio component 810 includes a microphone (MIC) that is configured to receive external audio signals when the user equipment 800 is in an operation mode, such as a call mode, a recording mode, and a voice recognition mode. The received audio signals can be further stored in the memory 804 or transmitted via the communication component 816. In some embodiments, the audio component 810 further includes a speaker for outputting audio signals.

The I/O interface 812 provides an interface between the processing component 802 and peripheral interface modules. The peripheral interface modules can be keyboards, a click wheels, a buttons, or the like. These buttons can include, but are not limited to, home button, volume button, start button, and lock button.

The sensor component 814 includes one or more sensors for providing the user equipment 800 with status assessment in various aspects. For example, the sensor component 814 can detect an open/closed state of the user equipment 800, relative positioning of components, such as the display and keypad of the user equipment 800. The sensor component 814 can also detect a change in position of the user equipment 800 or a component of the user equipment 800, the presence or absence of user contact with the user equipment 800, orientation or acceleration/deceleration of the user equipment 800, and temperature change of the user equipment 800. The sensor component 814 can include a proximity sensor configured to detect the presence of nearby objects without any physical contact. The sensor assembly 814 can also include a light sensor, such as a Complementary Metal-Oxide-Semiconductor (CMOS) or Charged Coupled Device (CCD) image sensor, for use in imaging applications. In some embodiments, the sensor component 814 can further include an acceleration sensor, a gyro sensor, a magnetic sensor, a pressure sensor, or a temperature sensor.

The communication component 816 is configured to facilitate wired or wireless communication between the user equipment 800 and other devices. The user equipment 800 can access a wireless network based on a communication standard, such as Wi-Fi, 2G or 3G, or a combination thereof. In an exemplary embodiment, the communication component 816 receives broadcast signals or broadcast-related information from an external broadcast management system via a broadcast channel. In one exemplary embodiment, the communication component 816 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the user equipment 800 can be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the above methods.

In an exemplary embodiment, there is also provided a non-transitory computer-readable storage medium including executable instructions, such as the memory 804 including executable instructions executable by the processor 820 of the user equipment 800 to implement the above methods. For example, the non-transitory computer-readable storage medium can be a ROM, a random access memory (RAM), a CD-ROM, a magnetic tape, a floppy disk, and an optical data storage device, etc.

Figure 9:
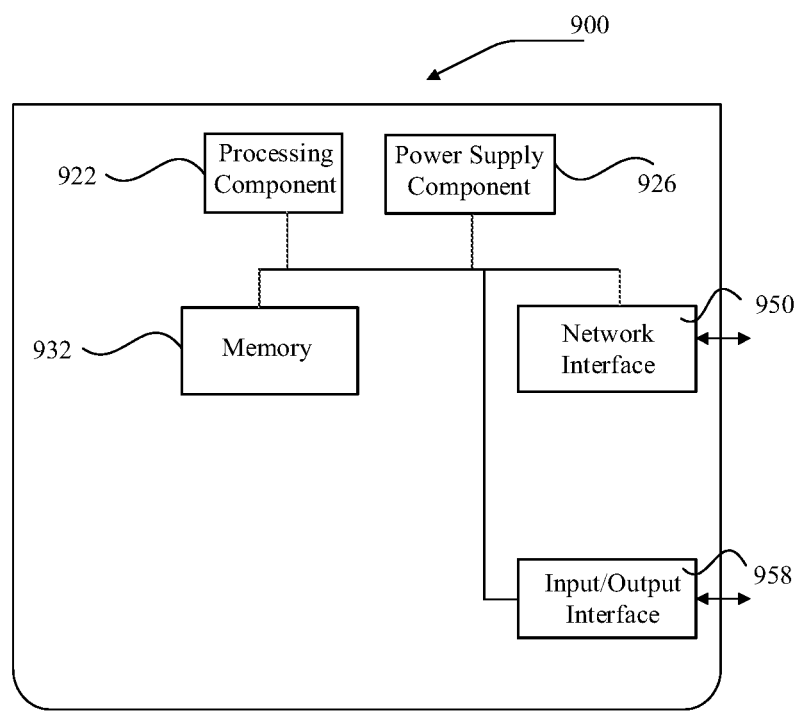
FIG. 9 is a block diagram illustrating a base station according to an exemplary embodiment.

FIG. 9 is a structure of a base station according to an embodiment of the present disclosure. For example, the base station 900 may be provided as a network side device. Referring to FIG. 9, the base station 900 includes a processing component 922, which further includes one or more processors, and a memory resource represented by a memory 932 for storing instructions executable by the processing component 922, such as an application program. The application program stored in memory 932 may include one or more modules, each corresponding to a set of instructions. In addition, the processing component 922 is configured to execute the instructions to perform any one of the above described methods applied to the base station, for example, the methods shown in FIGS. 2-3.

The base station 900 may also include a power supply component 926 configured to perform power management of the base station 900, a wired or wireless network interface 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™ or the like.

Those skilled in the art will readily recognize other embodiments of the present disclosure upon consideration of the specification and practice of the present disclosure disclosed herein. The present disclosure is intended to cover any variations, uses, or adaptations of the present disclosure, which follow general principles of the present disclosure and include common knowledge or customary means in the art that are not disclosed in the present disclosure. The specification and embodiments are exemplary only, with the true scope and spirit of the present disclosure being indicated by the following claims.

It should be understood that the present disclosure is not limited to the precise structure that has been described above and shown in the drawings, and various modifications and changes may be made without departing from the scope thereof. The scope of the present disclosure is limited only by the appended claims.

The invention claimed is:

1. A paging processing method, applied to a base station, the paging processing method comprising:
sending paging indication information carried by at least one bit to one or more user equipments (UEs), wherein the paging indication information is used to indicate a number of physical downlink shared channels (PDSCHs) for carrying paging messages corresponding to one paging occasion (PO) scheduled by downlink control information (DCI);
wherein the method further comprises:
receiving paging capability information of the UEs, wherein the paging capability information is used to indicate a number of the PDSCHs supported to be monitored by a respective UE of the UEs corresponding to one PO;
for a UE to be paged,
in response to receiving paging capability information indicating that the UE to be paged supports monitoring M PDSCHs corresponding to one PO, sending a paging message for the UE to be paged through any one of N PDSCHs scheduled by the DCI; wherein the M and the N are positive integers greater than or equal to 2, and the N is less than or equal to M; or
in response to receiving paging capability information indicating that the UE to be paged supports monitoring only one PDSCH corresponding to one PO, sending a paging message for the UE to be paged through a first PDSCH scheduled by the DCI.

2. The paging processing method according to claim 1, wherein sending the paging indication information carried by the at least one bit to the one or more user equipments (UEs) comprises:
sending the DCI including the paging indication information to the UEs, wherein the paging indication information is carried by at least one bit of the DCI.

3. The paging processing method according to claim 2, wherein the DCI is DCI 1-0, and the paging indication information is carried in a reserved bit field of the DCI 1-0.

4. The paging processing method according to claim 2, further comprising:
broadcasting a system message including a maximum number of the PDSCHs allowed to be scheduled by the DCI;
wherein the number of the PDSCHs scheduled by the DCI, which is indicated by the paging indication information, is less than or equal to the maximum number of the PDSCHs.

5. The paging processing method according to claim 1, wherein sending the paging indication information carried by the at least one bit to the one or more user equipments (UEs) comprises:
broadcasting a system message including the paging indication information, wherein the paging indication information is carried by at least one bit of the system message.

6. The paging processing method according to claim 1, wherein receiving the paging capability information of the UEs comprises:
receiving the paging capability information of the UEs sent by the UEs or a core network.

7. The paging processing method according to claim 1, further comprising:
for a UE to be paged,
according to a corresponding relationship between one or more UE groups and the PDSCHs scheduled by the DCI, sending a paging message for the UE to be paged through a PDSCH corresponding to the UE group to which the UE to be paged belongs.

8. A paging processing method, applied to a user equipment (UE), the paging processing method comprising:

receiving paging indication information carried by at least one bit sent by a base station, wherein the paging indication information is used to indicate a number of physical downlink shared channels (PDSCHs) for carrying paging messages corresponding to one paging occasion (PO) scheduled by downlink control information (DCI); and monitoring the paging messages corresponding to the one PO based on the paging indication information;

wherein the method further comprises:

sending paging capability information of the UE, wherein the paging capability information is used to indicate that a number of the PDSCHs supported to be monitored by the UE corresponding to one PO;

wherein monitoring the paging messages corresponding to the one PO based on the paging indication information comprises:

monitoring the paging messages on N PDSCHs scheduled by the DCI; wherein the N is less than or equal to M which is the number of the PDSCHs supported to be monitored by the UE corresponding to one PO, and the M and the N are positive integers greater than or equal to 2; or monitoring the paging messages on a first PDSCH of N PDSCHs scheduled by the DCI, wherein the N is a positive integer greater than or equal to 2.

9. The paging processing method according to claim 8, wherein receiving the paging indication information carried by the at least one bit sent by the base station comprises:

receiving the DCI including the paging indication information sent by the base station, wherein the paging indication information is carried by at least one bit of the DCI.

10. The paging processing method according to claim 9, wherein the DCI is DCI 1-0, and the paging indication information is carried in a reserved bit field of the DCI 1-0.

11. The paging processing method according to claim 9, further comprising:

receiving a system message including a maximum number of the PDSCHs allowed to be scheduled by the DCI broadcast by the base station;

wherein the number of the PDSCHs scheduled by the DCI, which is indicated by the paging indication information, is less than or equal to the maximum number of the PDSCHs.

12. The paging processing method according to claim 8, wherein receiving the paging indication information carried by the at least one bit sent by the base station comprises:

receiving a system message including the paging indication information broadcast by the base station, wherein the paging indication information is carried by at least one bit of the system message.

13. The paging processing method according to claim 8, wherein sending the paging capability information of the UE comprises:

sending the paging capability information of the UE to the base station or a core network.

14. The paging processing method according to claim 8, wherein monitoring the paging messages corresponding to the one PO based on the paging indication information further comprises:

according to a corresponding relationship between one or more UE groups and the PDSCHs scheduled by the DCI, monitoring the paging messages on one or more PDSCHs corresponding to a UE group to which the UE belongs.

15. A user equipment (UE), comprising:

a processor; and a memory configured to store instructions executable by the processor;

wherein the processor is configured to execute the instructions to implement the paging processing method according to claim 8.

16. A base station, comprising:

a processor; and a memory configured to store instructions executable by the processor;

wherein the processor is configured to execute the instructions to perform:

sending paging indication information carried by at least one bit to one or more user equipments (UEs), wherein the paging indication information is used to indicate a number of physical downlink shared channels (PDSCHs) for carrying paging messages corresponding to one paging occasion (PO) scheduled by downlink control information (DCI);

wherein the processor is further configured to perform:

receiving paging capability information of the UEs, wherein the paging capability information is used to indicate a number of the PDSCHs supported to be monitored by a respective UE of the UEs corresponding to one PO;

for a UE to be paged, in response to receiving paging capability information indicating that the UE to be paged supports monitoring M PDSCHs corresponding to one PO, sending a paging message for the UE to be paged through any one of N PDSCHs scheduled by the DCI; wherein the M and the N are positive integers greater than or equal to 2, and the N is less than or equal to M; or in response to receiving paging capability information indicating that the UE to be paged supports monitoring only one PDSCH corresponding to one PO, sending a paging message for the UE to be paged through a first PDSCH scheduled by the DCI.

* * * * *